(12) United States Patent
Jang

(10) Patent No.: US 11,173,948 B2
(45) Date of Patent: Nov. 16, 2021

(54) VEHICLE STEERING APPARATUS

(71) Applicant: HYUNDAI MOBIS CO., LTD., Seoul (KR)

(72) Inventor: Seok Hwan Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 173 days.

(21) Appl. No.: 16/663,757

(22) Filed: Oct. 25, 2019

(65) Prior Publication Data

US 2020/0130726 A1    Apr. 30, 2020

(30) Foreign Application Priority Data

Oct. 26, 2018 (KR) .................. 10-2018-0128999

(51) Int. Cl.
   *B62D 5/04* (2006.01)
   *B62D 3/12* (2006.01)
   *B62D 7/22* (2006.01)

(52) U.S. Cl.
   CPC ........... *B62D 5/0406* (2013.01); *B62D 3/126* (2013.01); *B62D 7/22* (2013.01)

(58) Field of Classification Search
   CPC ...... B62D 5/0406; B62D 5/04; B62D 5/0403; B62D 3/126; B62D 7/22; B62D 7/226
   See application file for complete search history.

(56) References Cited

U.S. PATENT DOCUMENTS

| | | | | |
|---|---|---|---|---|
| 6,843,343 B2* | 1/2005 | Shimizu | ................. | B62D 3/126 180/444 |
| 6,973,990 B2* | 12/2005 | Honaga | ................ | B62D 5/0421 180/444 |
| 2003/0188917 A1* | 10/2003 | Shimizu | ................. | B62D 3/126 180/444 |
| 2009/0266640 A1* | 10/2009 | Oshima | .................... | B62D 5/04 180/444 |
| 2013/0043088 A1* | 2/2013 | Heo | ......................... | B62D 5/04 180/444 |
| 2016/0264171 A1* | 9/2016 | Zaike | .................... | B62D 5/0403 |
| 2019/0016372 A1* | 1/2019 | Kimura | ................. | B62D 5/0424 |
| 2019/0263442 A1* | 8/2019 | Yoshida | ................. | F16C 19/26 |

FOREIGN PATENT DOCUMENTS

KR    10-1724726 B1    4/2017

* cited by examiner

*Primary Examiner* — Jacob D Knutson
*Assistant Examiner* — Michael R Stabley
(74) *Attorney, Agent, or Firm* — NSIP Law

(57) ABSTRACT

Disclosed herein is a vehicle steering apparatus that includes a main rack housing configured to surround a rack bar, a reduction-unit-side rack housing extending to one side of the main rack housing and connected to a reduction unit for reducing motor power, and an input-unit-side rack housing extending to the other side of the main rack housing and connected to a steering input unit having a pinion gear installed thereto, wherein the reduction-unit-side rack housing is formed with a first resonance reduction rib for reducing resonance.

9 Claims, 5 Drawing Sheets

VEHICLE STEERING APPARATUS

CROSS-REFERENCE TO RELATED APPLICATION

The present application claims priority to Korean Patent Application No. 10-2018-0128999, filed on Oct. 26, 2018 in the Korean Intellectual Property Office, which is incorporated herein by reference in its entirety.

BACKGROUND

1. Technical Field

Embodiments of the present disclosure relate to a vehicle steering apparatus, and more particularly, to a vehicle steering apparatus capable of minimizing generation of vibration and noise by changing a size and shape of a part of a rack housing and applying ribs to reduce resonance.

2. Related Art

In general, a steering system is a system for allowing a driver to change the direction of progress of a vehicle as intended and for assisting the driver in propelling the vehicle in a desired direction by arbitrarily changing the center of rotation of the front wheel of the vehicle.

Since the vehicle is made by connecting various hardware parts, the steering system may not be realized by the characteristics of only a single device, and is connected to various components on transmission path, such as a handle, a column, a subframe, a suspension, and a tire. Due to the connection to these components on transmission path, the excitation force generated from the steering system comes into contact with the resonance components of the various components, which causes strong vibration and additional noise.

The related art of the present invention is disclosed in Korean Patent No. 10-1724726 (published on Apr. 3, 2017, entitled "Vibration Insulator for Vehicle mounting Component").

SUMMARY

Various embodiments are directed to a vehicle steering apparatus capable of minimizing generation of vibration and noise by changing a size and shape of a part of a rack housing and applying ribs to reduce resonance.

In an embodiment, there is provided a vehicle steering apparatus that includes a main rack housing configured to surround a rack bar, a reduction-unit-side rack housing extending to one side of the main rack housing and connected to a reduction unit for reducing motor power, and an input-unit-side rack housing extending to the other side of the main rack housing and connected to a steering input unit having a pinion gear installed thereto, wherein the reduction-unit-side rack housing is formed with a first resonance reduction rib for reducing resonance.

The reduction-unit-side rack housing may include a first mount and a second mount for coupling with a main housing of the reduction unit, and the first resonance reduction rib may be formed around the first or second mount.

The main housing of the reduction unit may be provided with a bearing outer ring insert, and a second resonance reduction rib for reducing resonance may be formed around the bearing outer ring insert.

The second resonance reduction rib may consist of a plurality of second resonance reduction ribs arranged radially around the bearing outer ring insert.

A tubular structure may be provided at one side of the bearing outer ring insert, and a ring-shaped sixth resonance reduction rib may be formed at a boundary between the structure and the bearing outer ring insert.

A seventh resonance reduction rib may be formed in a longitudinal direction of the structure.

The second resonance reduction rib may consist of a plurality of second resonance reduction ribs that are all connected to the sixth resonance reduction rib.

The reduction-unit-side rack housing may be formed with a blade-shaped third resonance reduction rib connecting the first mount and the second mount, and the third resonance reduction rib may be connected to the first resonance reduction rib.

The first resonance reduction rib may be formed on a surface of the third resonance reduction rib.

The input-unit-side rack housing may include a third mount for coupling with the steering input unit and a fourth mount for coupling with a vehicle steering component, and a fourth resonance reduction rib for reducing resonance may be formed around the third or fourth mount.

The fourth mount may be formed with a blade-shaped fifth resonance reduction rib, and the fifth resonance reduction rib may be connected to the fourth resonance reduction rib.

As apparent from the above description, the vehicle steering apparatus according to the present invention can minimize the generation of vibration and noise by changing the size and shape of a part of the rack housing and applying the ribs to reduce resonance.

DETAILED DESCRIPTION

Hereinafter, a vehicle steering apparatus will be described in detail with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the invention and may change depending on the intention or practice of a user or an operator. Therefore, these terms should be defined based on the overall disclosures set forth herein.

Figure 1:
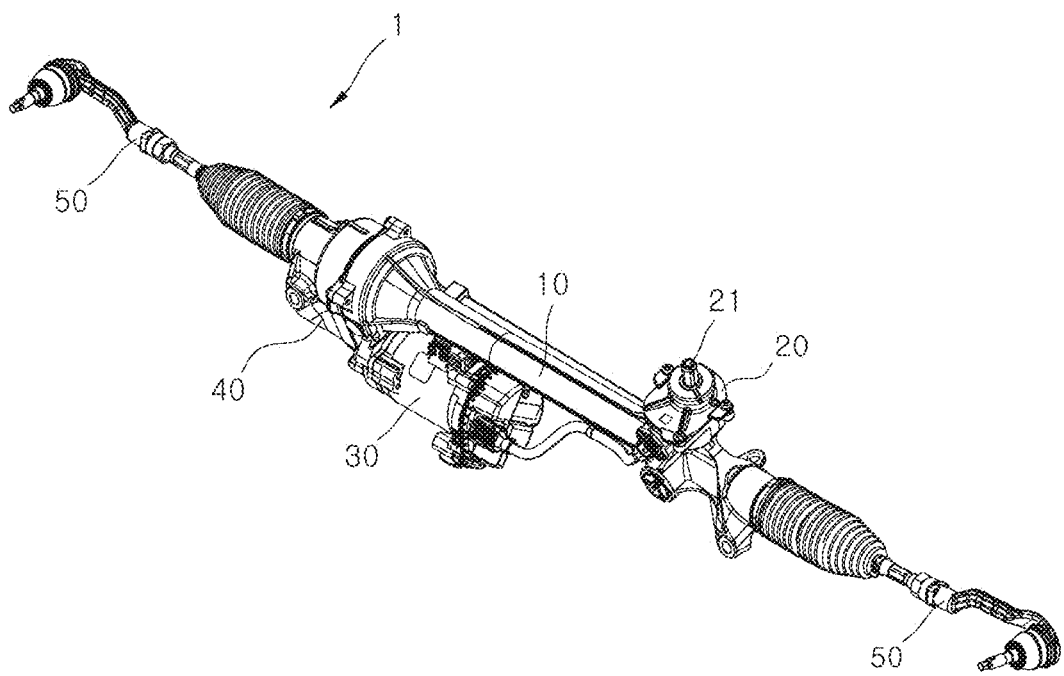
FIG. 1 is a view illustrating an overall configuration of a vehicle steering apparatus according to an embodiment of the present invention.
Figure 2:
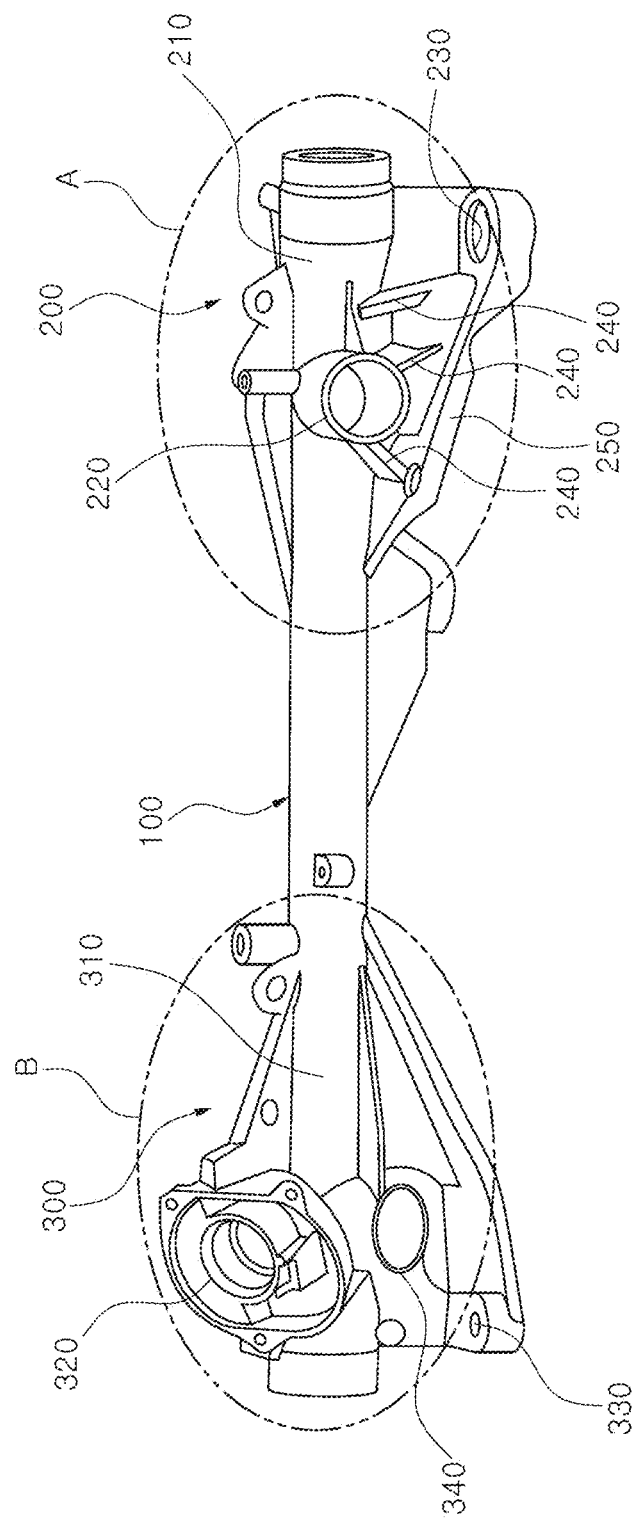
FIG. 2 is a view illustrating a rack housing unit applied to the vehicle steering apparatus according to the embodiment of the present invention.
Figure 3:
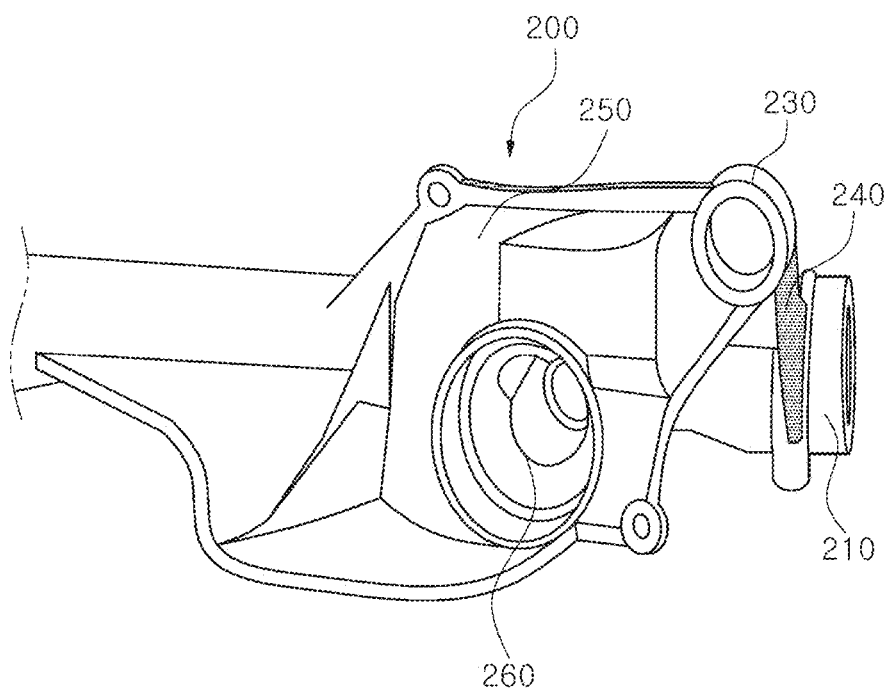
FIG. 3 is a bottom view illustrating a reduction-unit-side rack housing indicated by region "A" of FIG. 2.
Figure 4:
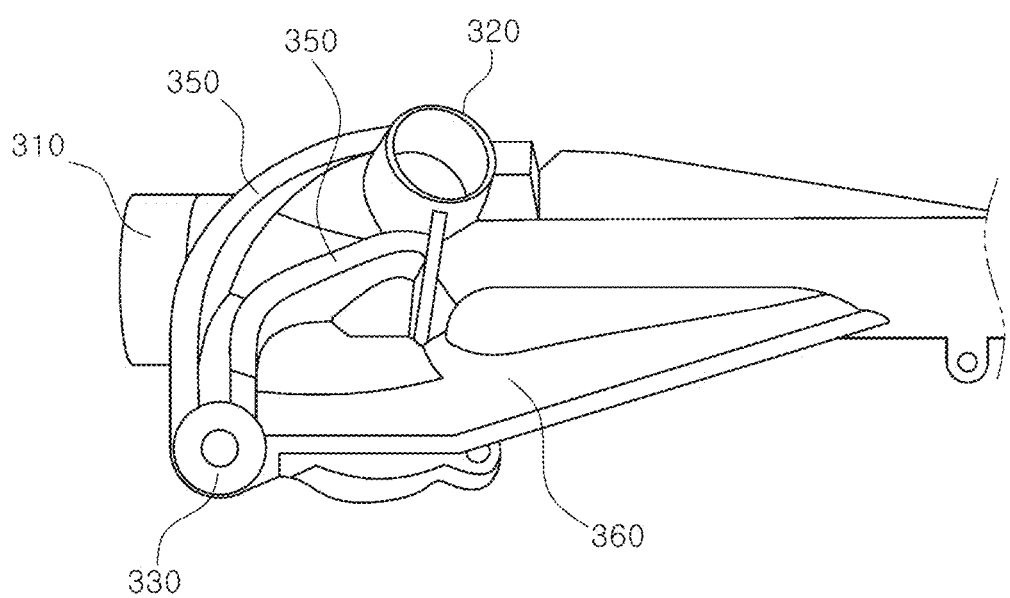
FIG. 4 is a bottom view illustrating an input-unit-side rack housing indicated by region "B" of FIG. 2.
Figure 5:
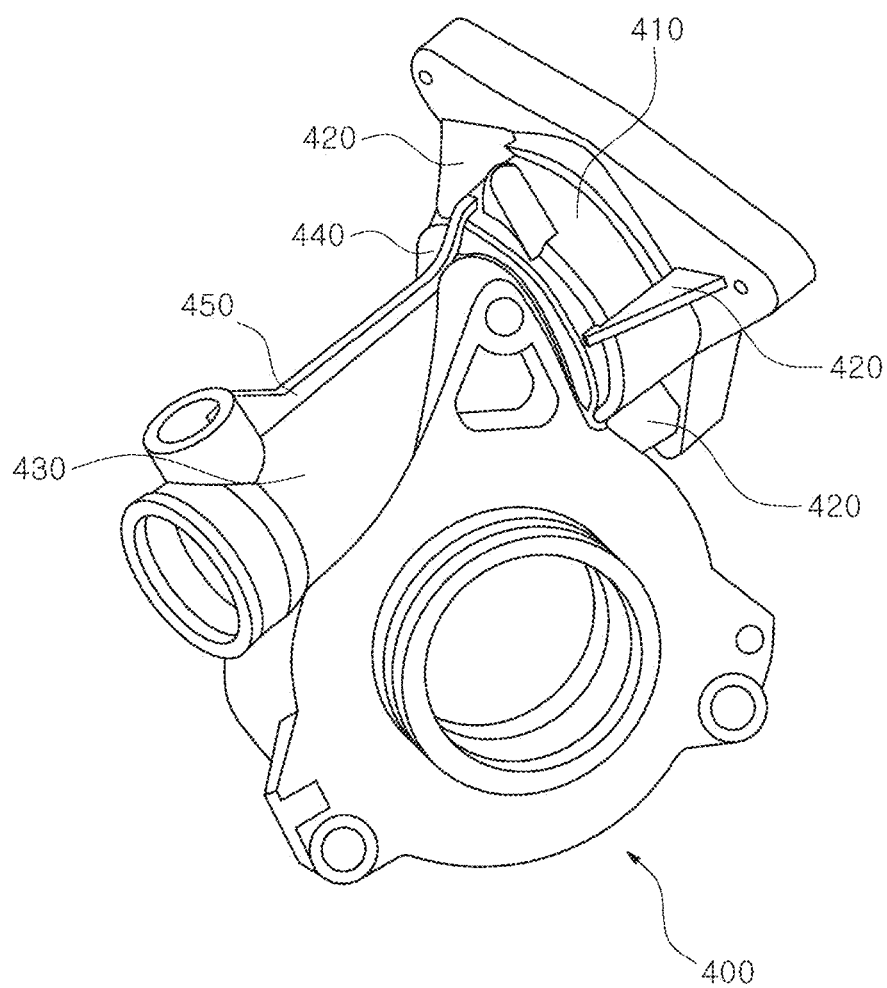
FIG. 5 is a view illustrating a main housing of a reduction unit applied to the vehicle steering apparatus according to the embodiment of the present invention.

FIG. 1 is a view illustrating an overall configuration of a vehicle steering apparatus according to an embodiment of the present invention. FIG. 2 is a view illustrating a rack housing unit applied to the vehicle steering apparatus according to the embodiment of the present invention. FIG. 3 is a bottom view illustrating a reduction-unit-side rack housing indicated by region "A" of FIG. 2. FIG. 4 is a bottom view illustrating an input-unit-side rack housing indicated by region "B" of FIG. 2. FIG. 5 is a view illustrating a main housing of a reduction unit applied to the vehicle steering apparatus according to the embodiment of the present invention.

FIG. 1 illustrates the overall configuration of the vehicle steering apparatus according to the embodiment of the present invention. The vehicle steering apparatus, which is designated by reference numeral 1, according to the embodiment of the present invention includes a rack housing unit 10, a steering input unit 20 connected to the rack housing unit 10 and having a pinion gear 21 installed thereto, a power pack unit 30 for assisting a steering force by motor power, a reduction unit 40 connected to the rack housing unit 10 for reducing the motor power, and tie rod ends 50 installed at both ends of the rack housing unit 10. The tie rod ends 50 connect a rack bar to wheels (not illustrated), thereby enabling a vehicle to be steered by rotating the wheels along with the movement of the rack bar.

The vehicle steering apparatus 1 according to the embodiment of the present invention includes the power pack unit 30 for assisting the steering force by the motor power to assist the operation force of the pinion gear 21. The power pack unit 30 is coupled to the rack housing unit 10 by bolting, welding, or the like, and converts the electric power supplied from the outside into rotary power to rotate the rack bar.

The vehicle steering apparatus 1 according to the embodiment of the present invention comes into contact with resonance components of various components that constitute or are connected to the vehicle steering apparatus 1, which may cause strong vibration and additional noise. Accordingly, the vehicle steering apparatus 1 according to the embodiment of the present invention can effectively reduce vibration and noise transmitted to a driver by installing ribs to the rack housing unit 10 of the vehicle to reduce resonance.

The rack housing unit 10 accommodates therein the rack bar rotating in engagement with the pinion gear 21. The rack housing unit 10 is made of a metal material and has a substantially circular tube shape that extends in the width direction of the vehicle.

The rack housing unit 10 includes a main rack housing 100, which has a circular tube shape for accommodation of the rack bar and surrounds the center of the rack bar, a reduction-unit-side rack housing 200, which extends to one side of the main rack housing 100 and is connected to the reduction unit 40 for reducing the motor power, and an input-unit-side rack housing 300 which extends to the other side of the main rack housing 100 and is connected to the steering input unit 20 having the pinion gear 21 installed thereto.

Referring to FIGS. 2 and 3, the reduction-unit-side rack housing 200 is formed with a first resonance reduction rib 240 for reducing resonance. The reduction-unit-side rack housing 200 includes a first mount 220 for coupling with a subframe of the vehicle, and a second mount 230 for coupling with a main housing 400 of the reduction unit 40. The first resonance reduction rib 240 is formed around the first or second mount 220 or 230. However, the first resonance reduction rib 240 may also be spaced apart from the first or second mount 220 or 230 by a certain distance.

Referring to FIG. 2, the reduction-unit-side rack housing 200 includes a reduction-unit-side tube 210 extending from the main rack housing 100 and is formed with a blade-shaped third resonance reduction rib 250 connecting the first mount 220 and the second mount 230. The third resonance reduction rib 250 may be connected to the first resonance reduction rib 240 and the first resonance reduction rib 240 may be formed on the surface of the third resonance reduction rib 250 as illustrated in FIG. 2.

Referring to FIGS. 1 and 5, the main housing 400 of the reduction unit 40 is provided with a bearing outer ring insert 410, and a plurality of second resonance reduction ribs 420 for reducing resonance are formed around the bearing outer ring insert 410. Preferably, the second resonance reduction ribs 420 are formed radially around the bearing outer ring insert 410 to minimize transmission of vibration and noise and to evenly distribute stiffness.

A tubular structure 430 is provided at one side of the bearing outer ring insert 410. A ring-shaped sixth resonance reduction rib 440 is formed at the boundary between the tubular structure 430 and the bearing outer ring insert 410. A seventh resonance reduction rib 450 is formed in the longitudinal direction of the structure 430. The plurality of second resonance reduction ribs 420 are all connected to the sixth resonance reduction rib 440. Through such configuration, it is possible to effectively reduce the resonance occurring in various directions.

Referring to FIGS. 2 and 4, the input-unit-side rack housing 300 includes an input-unit-side tube 310 extending from the main rack housing 100. The input-unit-side rack housing 300 includes a third mount 320 for coupling with the steering input unit 20, a fourth mount 330 for coupling with a steering component of the vehicle, and a fifth mount 340 for coupling with the subframe of the vehicle. A fourth resonance reduction rib 350 for reducing resonance is formed around the third or fourth mount 320 or 330. Here, the steering component of the vehicle refers to a steering-related component except for the steering input unit.

The fourth mount 330 is formed with a blade-shaped fifth resonance reduction rib 360, and the fifth resonance reduction rib 360 is connected to the fourth resonance reduction rib 350.

By the first resonance reduction rib 240, the second resonance reduction ribs 420, the third resonance reduction rib 250, the fourth resonance reduction rib 350, the fifth resonance reduction rib 360, the sixth resonance reduction rib 440, and the seventh resonance reduction rib 450 applied to the vehicle steering apparatus 1 according to the embodiment of the present invention, the resonant frequency around the rack housing unit 10 may be induced to be an avoided resonant frequency, thereby minimizing the generation of vibration and noise.

As described above, according to the present invention, it is possible to minimize the generation of vibration and noise by changing the size and shape of a part of the rack housing and applying the ribs to reduce resonance.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:
1. A vehicle steering apparatus comprising:
a main rack housing configured to surround a rack bar;

a reduction-unit-side rack housing extending to one side of the main rack housing and connected to a reduction unit for reducing motor power; and an input-unit-side rack housing extending to the other side of the main rack housing and connected to a steering input unit having a pinion gear installed thereto, wherein the reduction-unit-side rack housing comprises a first mount and a second mount for coupling with a main housing of the reduction unit, wherein the reduction-unit-side rack housing is formed with a first resonance reduction rib formed around the first or the second mount, and wherein the main housing of the reduction unit is provided with a bearing outer ring insert, and a second resonance reduction rib is formed around the bearing outer ring insert.

2. The vehicle steering apparatus according to claim 1, wherein the second resonance reduction rib comprises a plurality of resonance reduction ribs arranged radially around the bearing outer ring insert.

3. The vehicle steering apparatus according to claim 1, wherein a tubular structure is provided at one side of the bearing outer ring insert, and a ring-shaped third resonance reduction rib is formed at a boundary between the structure and the bearing outer ring insert.

4. The vehicle steering apparatus according to claim 3, wherein a fourth resonance reduction rib is formed in a longitudinal direction of the structure.

5. The vehicle steering apparatus according to claim 4, wherein the second resonance reduction rib comprises a plurality of resonance reduction ribs that are all connected to the third resonance reduction rib.

6. A vehicle steering apparatus comprising:
a main rack housing configured to surround a rack bar;
a reduction-unit-side rack housing extending to one side of the main rack housing and connected to a reduction unit for reducing motor power; and an input-unit-side rack housing extending to the other side of the main rack housing and connected to a steering input unit having a pinion gear installed thereto, wherein the reduction-unit-side rack housing comprises a first mount and a second mount for coupling with a main housing of the reduction unit, wherein the reduction-unit-side rack housing is formed with a first resonance reduction rib formed around the first or second mount, and wherein the reduction-unit-side rack housing is formed with a blade-shaped second resonance reduction rib connecting the first mount and the second mount, and the second resonance reduction rib is connected to the first resonance reduction rib.

7. The vehicle steering apparatus according to claim 6, wherein the first resonance reduction rib is formed on a surface of the second resonance reduction rib.

8. A vehicle steering apparatus comprising:
a main rack housing configured to surround a rack bar;
a reduction-until-side rack housing extending to one side of the main rack housing and connected to a reduction unit for reducing motor power; and an input-unit-side rack housing extending to the other side of the main rack housing and connected to a steering input unit having a pinion gear installed thereto, wherein the reduction-unit-side rack housing is formed with a first resonance reduction rib, and wherein the input-unit-side rack housing comprises a first mount for coupling with the steering input unit and a second mount for coupling with a vehicle steering component, and a second resonance reduction rib for reducing resonance is formed around the first or the second mount.

9. The vehicle steering apparatus according to claim 8, wherein the second mount is formed with a blade-shaped third resonance reduction rib, and the third resonance reduction rib is connected to the second resonance reduction rib.

\* \* \* \* \*